United States Patent [19]

Olson

[11] Patent Number: 5,463,932

[45] Date of Patent: Nov. 7, 1995

[54] COFFEE MAKER

[76] Inventor: Allen W. Olson, 14703 W. Lake Goodwin Rd., Stanwood, Wash. 98292

[21] Appl. No.: 374,855

[22] Filed: Jan. 19, 1995

[51] Int. Cl.⁶ .................................................. A47J 31/42
[52] U.S. Cl. .............................. 99/280; 99/286; 241/100
[58] Field of Search .................................. 99/286, 289 R, 99/300, 304, 279, 290, 280, 281, 282, 283, 285; 241/100, 101.2, 65

[56] References Cited

U.S. PATENT DOCUMENTS

| D. 255,120 | 5/1980 | Bardeau | D15/113 |
|---|---|---|---|
| 3,107,600 | 10/1963 | Brun-Buisson | 99/286 |
| 3,967,546 | 7/1976 | Cailliot | 99/286 |
| 4,172,413 | 10/1979 | Roseberry | 99/282 |
| 4,188,863 | 2/1980 | Grossi | 99/286 |
| 4,196,658 | 4/1980 | Takagi et al. | 99/286 |
| 4,406,217 | 9/1983 | Oota | 99/280 |
| 4,412,481 | 11/1983 | Oota et al. | 99/280 |
| 4,510,853 | 4/1985 | Takagi | 99/286 |
| 4,624,177 | 11/1986 | Ito et al. | 99/286 |
| 4,671,668 | 6/1987 | Narita et al. | 386/10 |
| 4,703,687 | 11/1987 | Wei | 99/286 |
| 4,706,555 | 11/1987 | Nakamura et al. | 99/283 |
| 4,762,055 | 8/1988 | Shimomura | 99/285 |
| 4,858,522 | 8/1989 | Castelli | 99/280 |
| 4,895,308 | 1/1990 | Tanaka | 241/65 |
| 4,962,693 | 10/1990 | Miwa et al. | 99/283 |
| 4,970,948 | 11/1990 | Giannelli | 99/280 |
| 5,083,502 | 1/1992 | Enomoto | 99/286 |
| 5,174,194 | 12/1992 | Piana | 99/286 |
| 5,186,399 | 2/1993 | Knepler et al. | 241/34 |
| 5,207,148 | 5/1993 | Anderson et al. | 99/281 |
| 5,241,898 | 9/1993 | Newnan | 99/280 |
| 5,285,705 | 2/1994 | Buttle et al. | 99/280 |
| 5,287,795 | 2/1994 | Enomoto | 99/286 |
| 5,307,733 | 5/1994 | Enomoto | 99/280 |
| 5,322,005 | 6/1994 | Enomoto | 99/282 |

OTHER PUBLICATIONS

Coffee Makers, *Consumer Reports*, Oct. 1984, pp. 652–655.
Starbucks Coffee Grinder Advertisement, Undated.

*Primary Examiner*—Robert W. Jenkins
*Attorney, Agent, or Firm*—Christensen O'Connor Johnson & Kindness

[57] ABSTRACT

A coffee maker (20) includes a housing (21) supporting a coffee grinder (23) for grinding coffee beans, and a brewer which includes a reservoir (24) for holding water, a filter basket (28) for receiving ground coffee beans discharged from the grinder and water from the reservoir, a pump (66) in fluid communication with the reservoir, and a heater (74) for heating water from the reservoir. In the preferred embodiment, the pump pumps water through the heater, which heats the water, and then into the filter basket. The coffee maker also includes a thermally insulated carafe (30), removably connected to the housing for receiving brewed coffee from the filter basket of the brewer. A central processing unit (32) having a memory (48) is operably connected to the pump, heater, and grinder for causing coordinated operation of the coffee maker at times based on data stored in the memory of the central processing unit.

17 Claims, 8 Drawing Sheets

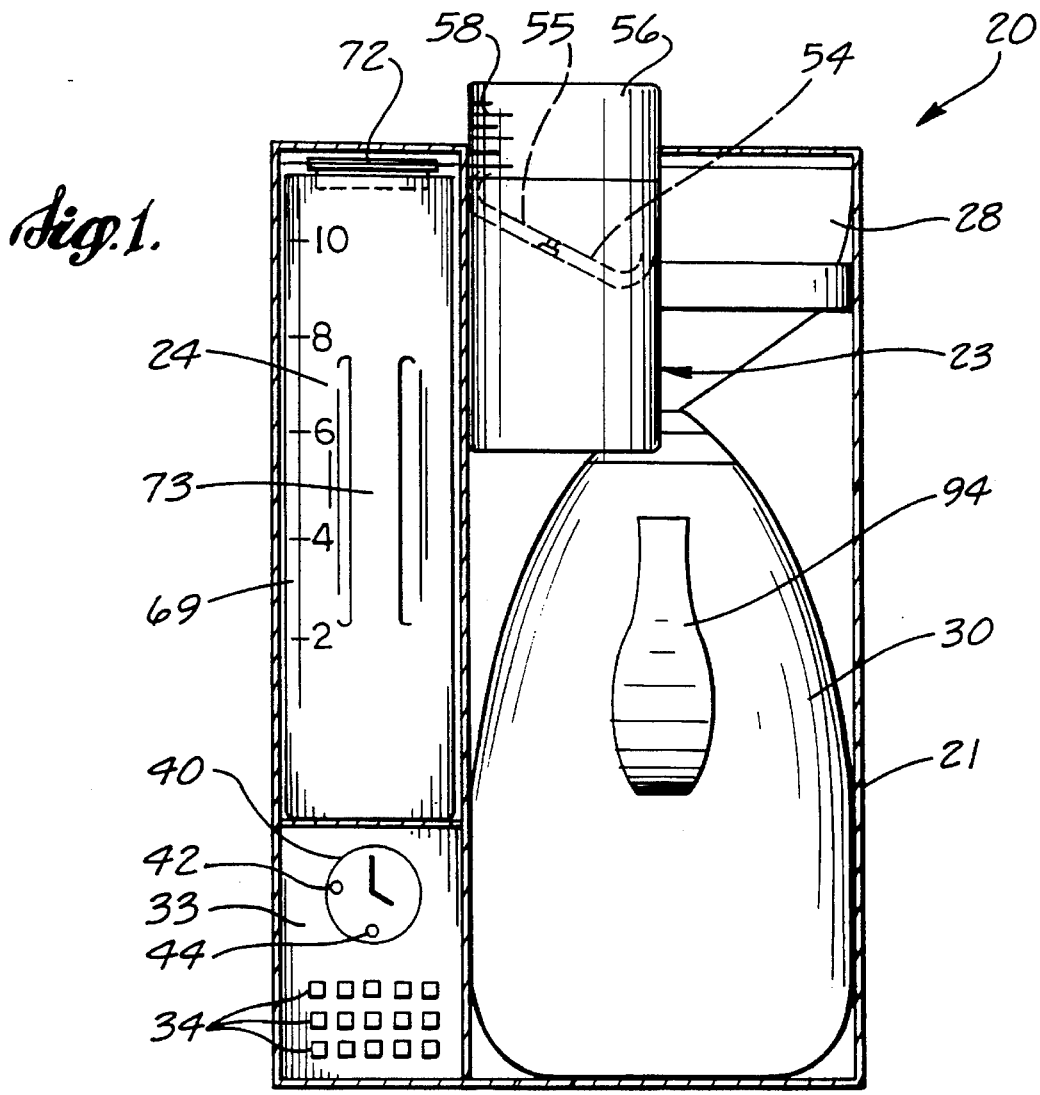

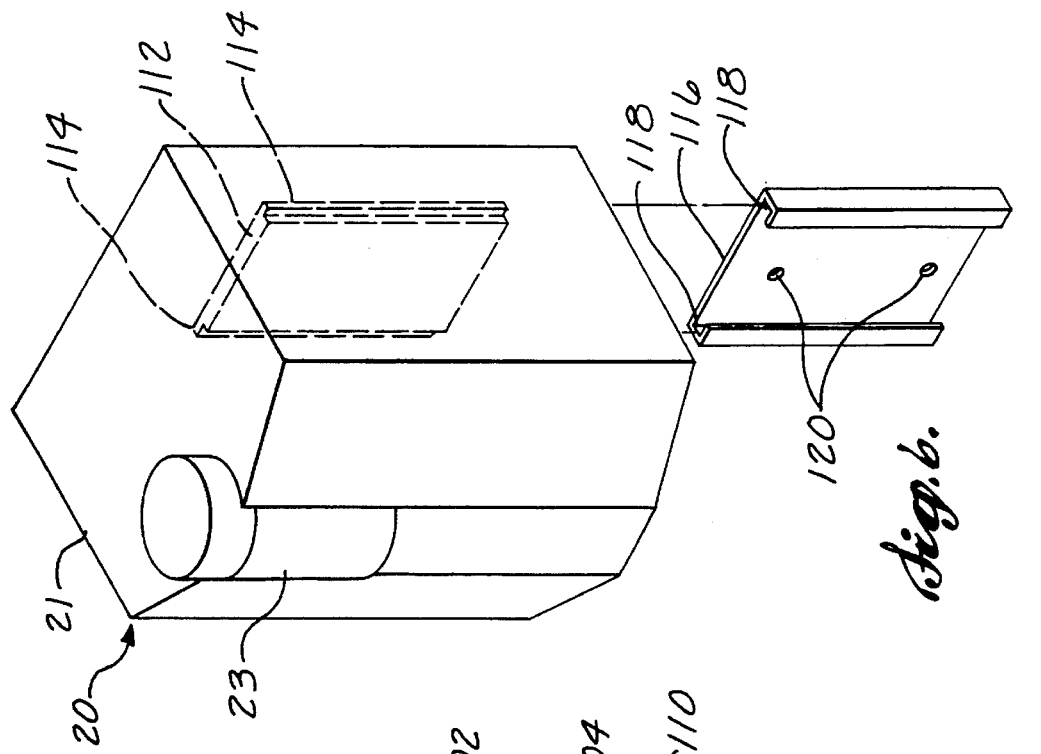
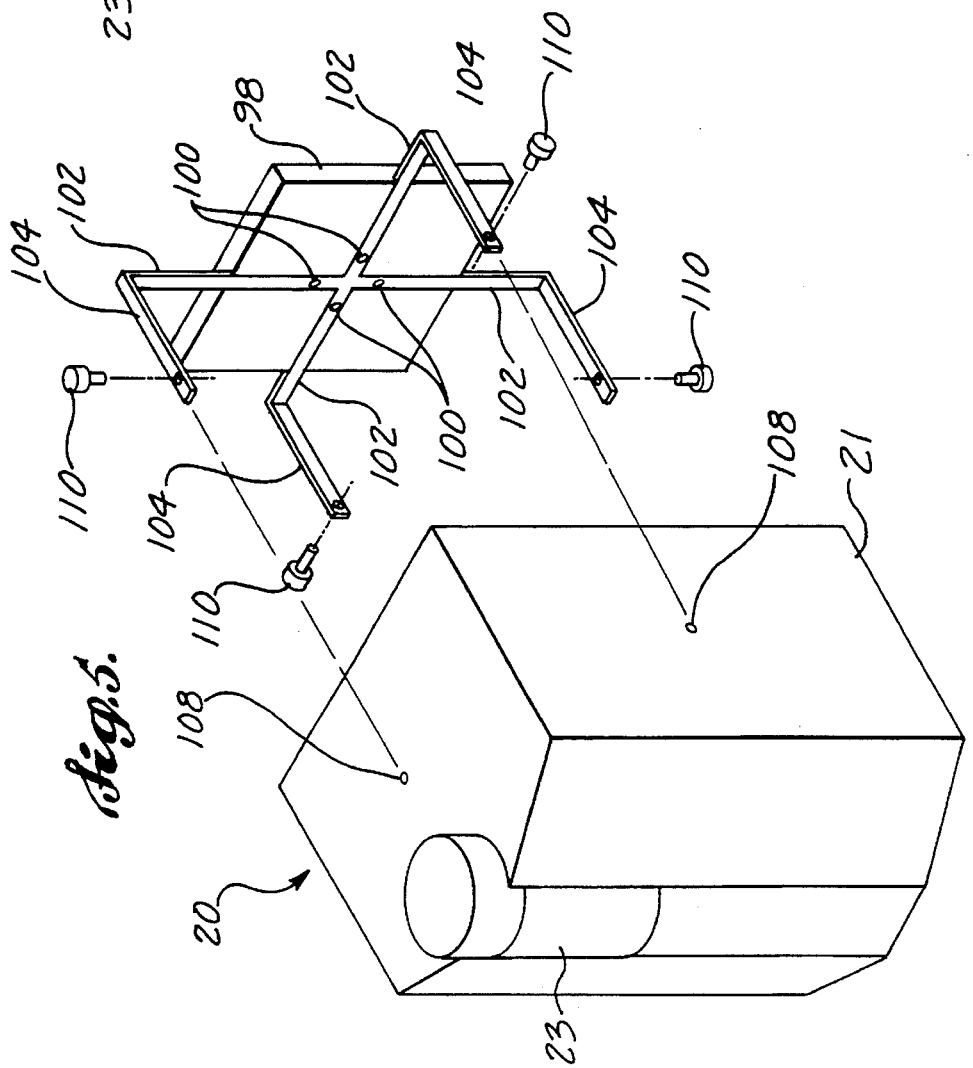

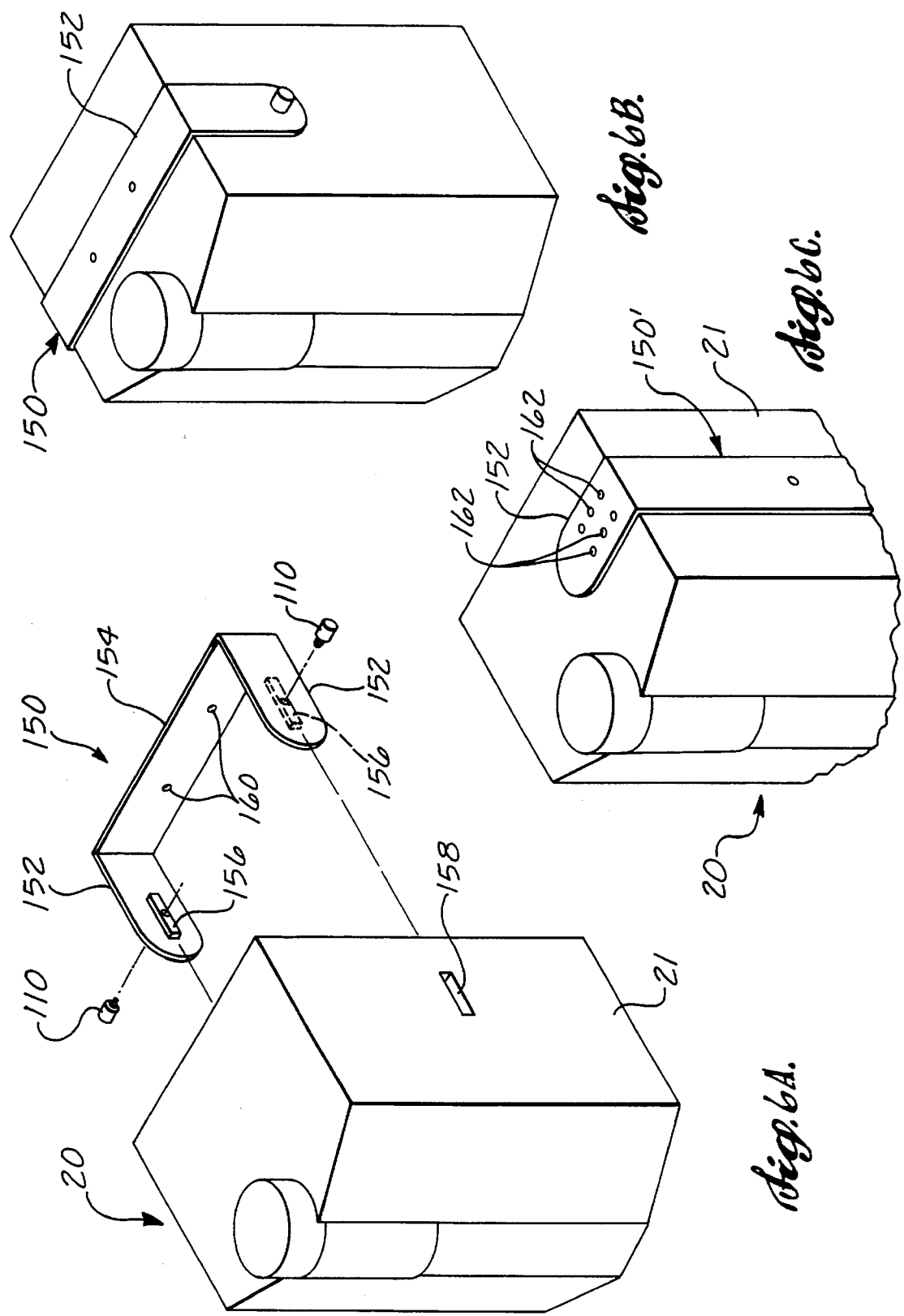

COFFEE MAKER

FIELD OF THE INVENTION

The present invention relates to coffee makers and, more particularly, to coffee makers incorporating an integral bean grinder, brewer, thermally insulated carafe and a timer or central processing unit for making coffee from beans at a predetermined time.

BACKGROUND OF THE INVENTION

Coffee and coffee houses have surged in popularity. As a result, consumers have become more particular about the coffee that they are willing to drink. Many consumers prefer to buy whole bean coffee roasts, and grind their own coffee because coffee made from fleshly ground beans has a superior aroma and taste. One main appeal of coffee is its aroma. Unfortunately, the aroma quickly escapes from ground coffee beans. Hence, coffee must be made relatively quickly from freshly ground beans to achieve superior aroma and taste.

Numerous devices for making coffee include timers that can be set to brew coffee at selected times. The user places water and coffee in the device, sets the timer, and the device brews the coffee at the appropriate time. However, many of these devices do not include a grinder that is controlled by the timer. Hence, coffee beans must be ground in advance, and left in the device until the desired time. Thus, the ground coffee beans usually lose their aroma well before the coffee is brewed.

The devices for making coffee also often include a pot for receiving the coffee, which keeps the coffee warm by means of an electric burner. However, a problem with this arrangement is that brewed coffee also loses its aroma over time. Thus, while these devices are capable of keeping a pot of coffee made from freshly ground beans warm for hours on an electric burner, often the coffee has long since lost its desirable aroma and taste. Additional problems are that the pots are not thermally insulated so that unnecessary energy is expended keeping the coffee warm, persons often inadvertently burn themselves on the hot electric burners, and the electric burners are a potential fire hazard.

Accordingly, the present invention provides an improved solution to the above problems.

SUMMARY OF THE INVENTION

The invention provides a coffee maker for making coffee. The coffee maker includes a housing supporting a coffee grinder for grinding coffee beans; a brewer which includes a reservoir for holding water, a filter basket for receiving ground coffee beans from the grinder and water from the reservoir; a pump in fluid communication with the reservoir; and a heater for heating water from the reservoir. A thermally insulated carafe is removably connected to the housing for receiving coffee from the filter basket of the brewer. In a preferred embodiment, the pump pumps water through the heater, which heats the water, and then into the filter basket. Preferably, the water is pumped through a shower head positioned over the top portion of the filter basket, for showering water down into the filter basket. A central processing unit having a memory is electrically connected to the pump, heater, and grinder for causing operation of the coffee maker at times based on data stored in the memory of the central processing unit.

A control panel is electrically connected to the central processing unit for controlling the central processing unit. The control panel includes a plurality of switches, each switch providing an electrical signal received by the central processing unit when a switch is pressed, wherein pressing one of the switches causes the central processing unit to operate the coffee maker in manual mode based on electrical signals received from the switches, rather than at times based on data stored in the memory of the central processing unit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 illustrates a front view of a preferred embodiment of a coffee maker in accordance with the present invention;

FIG. 2 illustrates a top view of the coffee maker of FIG. 1;

FIGS. 5–6D illustrate brackets for removably mounting the coffee maker of FIG. 1;

DETAILED DESCRIPTION OF THE PREFERRED EMBODIMENTS

Figure 3:
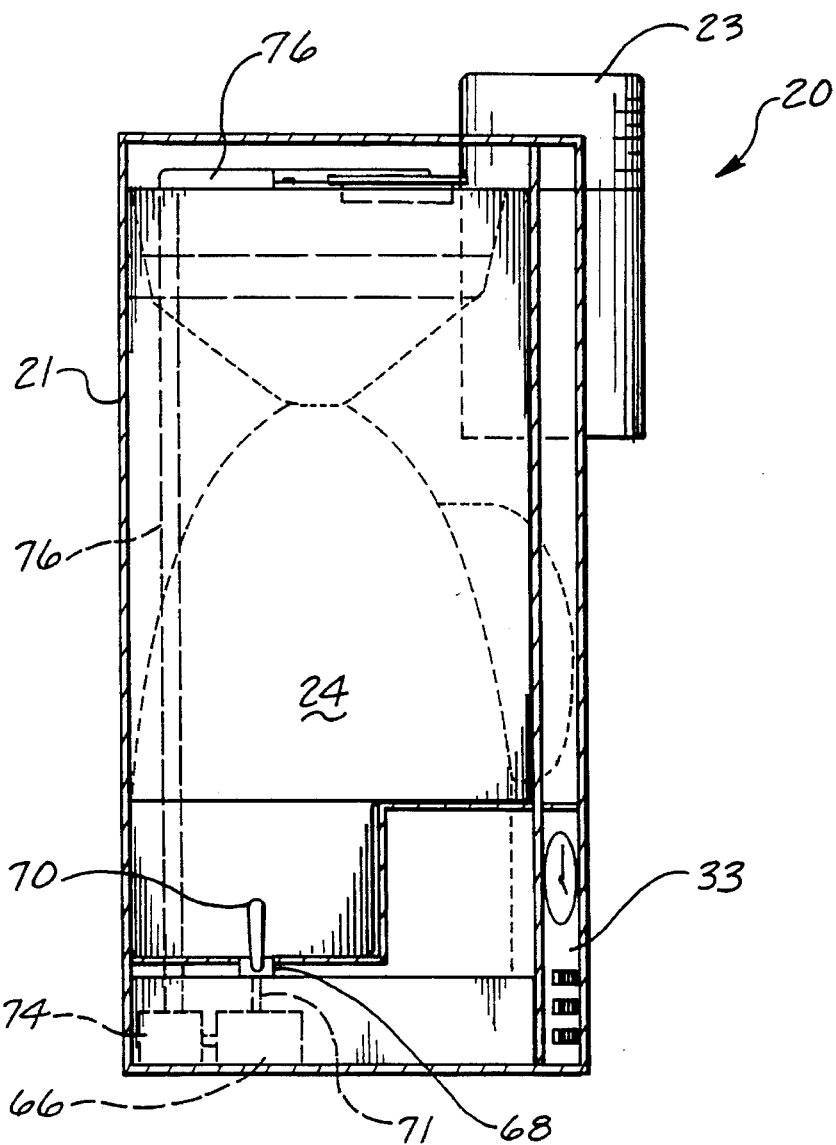
FIG. 3 illustrates a side view of the coffee maker of FIG. 1.

Shown in FIG. 1 is a preferred embodiment of a coffee maker, indicated generally by reference numeral 20, in accordance with the present invention for making coffee. The coffee maker 20 includes a housing 21 supporting a grinder 23 for grinding coffee beans, and several components forming a brewer. Some of the major components of the brewer are a reservoir 24 for holding water, a filter basket 28 for filtering water through ground coffee beans, and a thermal carafe 30.

Figure 7:
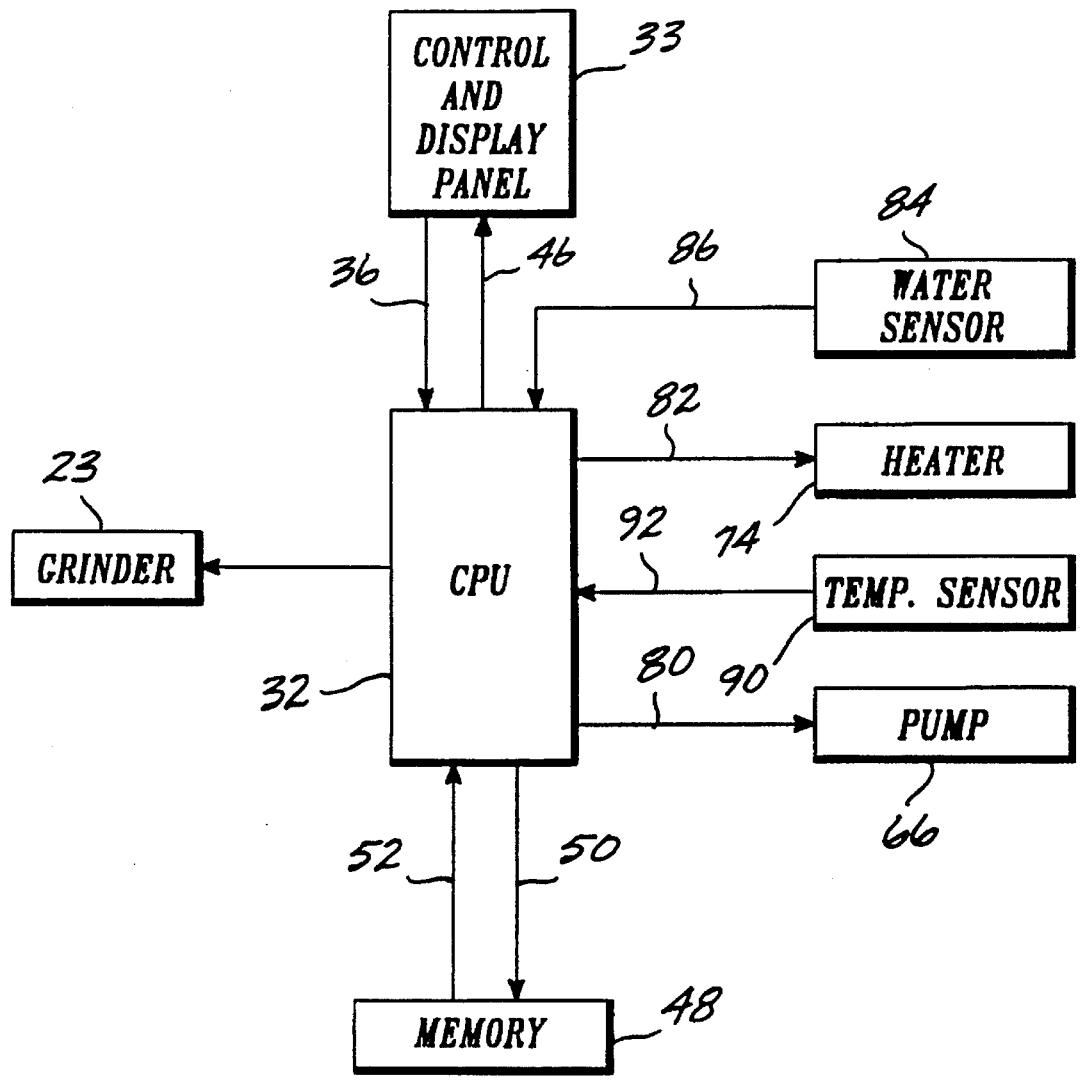
FIG. 7 illustrates a schematic, electrical block diagram for the coffee maker of FIG. 1.

As indicated schematically in FIG. 7, the coffee maker 20 includes a conventional central processing unit (CPU) 32 typically used to control consumer goods, such as microwave ovens, ranges, video cassette recorders (VCRs), televisions, etc., that incorporate electronic functions. The CPU 32 is electrically connected to a control and display panel 33, and receives electrical signals 36 therefrom. Preferably, the CPU 32 is located behind the control and display panel 33.

As shown in FIG. 1, the control and display panel 33 includes a plurality of conventional switches or buttons 34 that are configured to remain in the open position until pressed, whereupon the buttons close until the pressing force is removed. Pressing a button 34 causes electrical signals 36 to be received by the CPU 32 that controls the operation of the coffee maker. The buttons 34 on the control and display panel 33 are pressed to control the operation of the CPU 32, which in turn controls the operation of the coffee maker 20.

The control and display panel 33 includes a clock 40, which may have a traditional face and hands as shown, or a digital display (not shown) for indicating the time of day. The clock 40 includes an AM/PM indicator 42 to indicate whether it is morning (AM) or afternoon (PM), and an alarm display 44. The alarm display 44 indicates at what time CPU 32 will cause the coffee maker 20 to begin making coffee. The control and display panel 33 may include other displays as well, such as a display for indicating the temperature the water in reservoir 24 is to be heated, or particular days or dates the coffee maker 20 is to make coffee.

Referring to FIG. 7, the CPU 32 sends electrical signals 46 to the control and display panel 33 so that the appropriate information is displayed by the clock 40, AM/PM indicator 42, and alarm display 44. In particular, the CPU 32 includes an internal timer (not shown) to keep track of the time elapsed from a time that has been entered through the control and display panel 33. Based on the entered time and the time elapsed, the CPU 32 sends electrical signals 46 to control and display panel 33 for displaying the current time on clock 40, and whether it is afternoon or morning on the AM/PM indicator 42. Further, the electrical signals 46 also cause the alarm display 44 to display the time the coffee maker 20 is to begin making coffee. Other information may be displayed as well, such as error indications if an incorrect value has been entered through the control and display panel 33, the temperature that the water from reservoir 24 is to be heated, or other information.

The CPU 32 respectively stores and accesses data in memory 48 through electrical signals 50 and 52. Data, such as the time to begin making coffee, the temperature to heat water to, and other information, is stored in memory 48 via electrical signals 50. When required, the CPU 32 retrieves the data via electrical signals 52.

The CPU 32 is electrically connected to the grinder 23. At the appropriate time, the CPU 32 causes the grinder 23 to operate to grind beans that have previously been placed in the grinder. In a preferred embodiment, the grinder 23 is operated for a length of time that has been predetermined as sufficient to grind the amount of beans necessary for making the maximum amount of coffee that the coffee maker 20 can make at one time. Specifically, if the water reservoir is able to only hold water sufficient to make twelve cups of coffee, for example, then the grinder 23 is operated for an amount of time necessary to grind beans to make twelve cups of coffee.

In an alternate embodiment, the user may enter the actual amount of coffee to be made through control and display panel 33, which would then vary the amount of time the grinder 23 is to be operated. In another embodiment, the coffee maker 20 may include a water level sensor in the reservoir 24, connected to the CPU 32, which would then vary the amount of time to operate the grinder 23, depending on how much water is in the reservoir. Another option in accordance with the invention, is to include a bean level sensor connected to the CPU 32, to directly sense the amount of beans in the grinder 23 and operate the grinder for the amount of time necessary to adequately grind that amount of beans.

Referring to FIG. 1, the grinder 23 is of a conventional type, having a blade 54 (shown in phantom) that is spun rapidly by an electric motor (not shown) to grind coffee beans. In a preferred embodiment, the floor 55 of the grinding chamber, and the blade 54 are oriented generally parallel to one another, at an angle relative to horizontal. An angled grinding chamber floor 55 makes it easier to access the floor for cleaning, and as will be explained in more detail later, tends to concentrate the ground beans on one side of the grinding chamber for transfer to the filter basket 28. In alternate embodiments, the blade 54 and the floor 55 of the grinding chamber may be oriented generally horizontal.

The grinder 23 includes a cap 56 which is removed from the grinder to place the coffee beans therein. The cap 56 includes a ruled scale 58 formed vertically on the cap for correlating a depth of coffee beans with approximate units of coffee. More particularly, when the cap 56 is removed from the grinder 23, the cap is inverted and coffee beans are placed therein to a depth corresponding to the desired amount of coffee. The beans are then poured from the cap 56 into the portion of the grinder 23 having the blade 54 for subsequent grinding.

Figure 4:
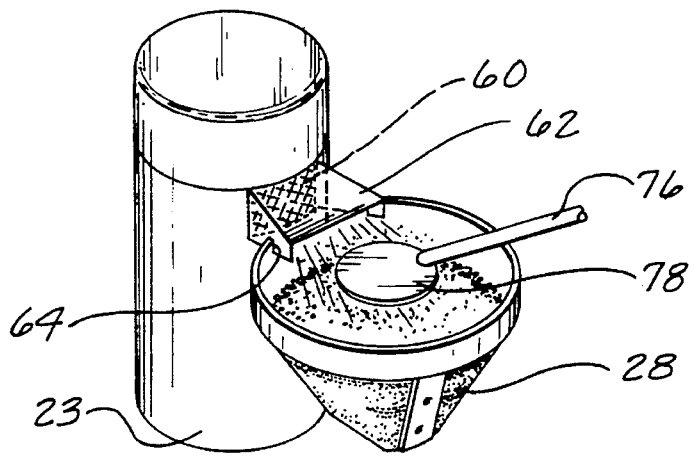
FIG. 4 illustrates an enlarged view of the grinder and the filter basket of FIG. 1.

FIG. 4 shows a perspective view of the grinder 23 and the filter basket 28 removed from the coffee maker 20. Formed on the side of the grinder 23 adjacent the filter basket 28 is an opening covered by a screen 60. When the beans are ground, centrifugal force causes the beans to be thrown against the interior walls of the grinder 23 as the beans are ground. If the beans have been ground to a small enough size, the ground beans escape through the screen 60 into the filter basket 28. In addition, the floor of the grinding chamber 55 is tilted towards the screen 60, such that the ground beans tend to concentrate at the screen.

A generally wedge-shaped shield 62 projects downward at an acute angle from the upper edge of the screen 60, and along the vertical edges of the screen. The shield 62 directs ground beans downward into the filter basket 28. Preferably, shield 62 is made of a heat and moisture resistant material that can safely contact food, such as plastic or stainless steel.

The filter basket 28 includes a notched region 64 adjacent the grinder 23, so that the filter basket 28 fits snugly underneath the shield 62 against the grinder for receiving ground beans therefrom. In a preferred embodiment, the filter basket 28 is formed of a metal suitable for contact with coffee, such as metal plated with gold, or stainless steel, and is reusable. The filter basket 28 is easily removable from the coffee maker 20 for cleaning. Alternatively, paper filters may be placed in filter basket 28.

Preferably, the mesh size of screen 60 is sized to correspond to the type of filter basket 28 that is used. More particularly, water tends to flow more quickly through filter baskets having a conically-shaped bottom, compared to filter baskets having a flat bottom. Thus, filter baskets having a conically-shaped bottom require coffee beans that are ground finer to increase the amount of flavor that the water acquires from the ground beans. In contrast, water flows relatively slowly through flat-bottomed filter baskets. Hence, flat-bottomed filter baskets require beans ground to a coarser size because the water spends more time in contact with the ground beans. Therefore, the mesh size of screen 60 is sized to pass beans of the correct ground size for the type of filter basket 28 that is used. (Filter baskets having conically-shaped bottoms, flat bottoms, or other geometries may be used in accordance with the present invention.)

In an alternate embodiment, the screen 60 (see FIG. 4) of the grinder 23 is replaceable with other screens having different mesh sizes. In this way, the grinder can be caused to make coffee grounds of either coarser or finer size, depending upon the mesh size of the screen that is used. Additionally, in this alternate embodiment, the user is given an option to use different types of filter baskets 28, such as filter baskets having conically-shaped bottoms, flat-bottoms or other types of filter baskets. Thus, the user can adjust the coffee ground size to correspond to the type of filter basket 28 that is used, i.e. finer grounds for filter baskets having conically-shaped bottoms, and coarser grounds for filter baskets having flatter bottoms or geometries that slow the flow of water therethrough. Preferably, in this alternate embodiment, the type of filter basket 28, such as conically-shaped or flat-bottomed, is entered through a button or buttons 34 on the control and display panel 33. Thus, the CPU 32 can adjust the amount of time that the grinder 23 is operated, depending on the type of filter basket 28, and screen 60 that is used.

Figure 4A:
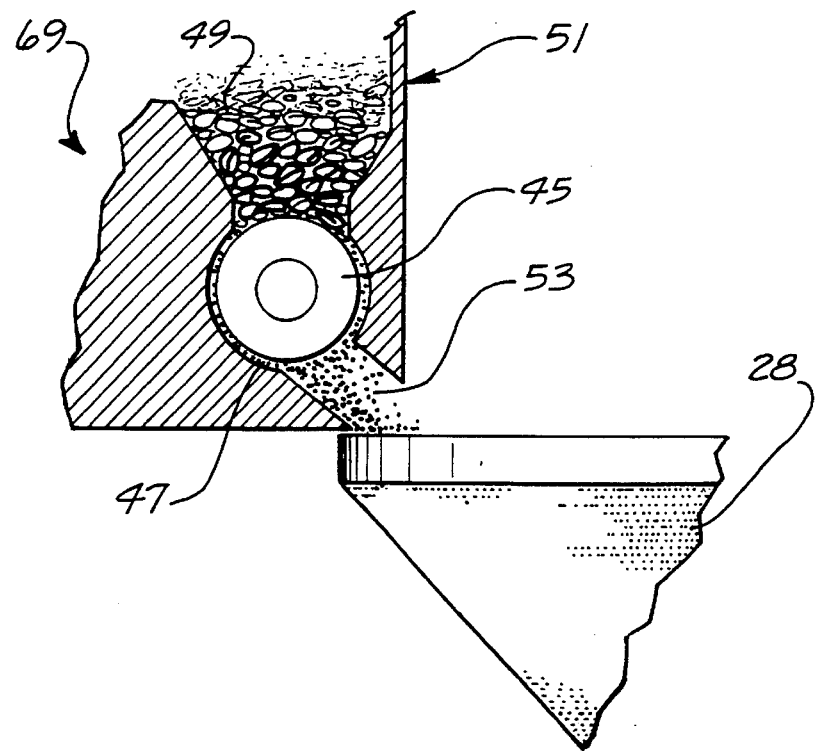
FIG. 4A illustrates a cross-sectional view of a portion of another grinder that is suitable for use with the coffee maker of FIG. 1.

In an alternate embodiment, a burr-type grinder 63 may be used as shown in FIG. 4A, in place of a blade-type grinder 23. As shown, the burr-type grinder 63 includes a grinding wheel 45 rotated by a motor (not shown). The wheel 45 is disposed concentrically within a cylindrical chamber 47, having a diameter slightly greater than the diameter of the wheel. Beans 49 are placed in a hopper 51 above the wheel 45, wherein the bottom of the hopper opens into the chamber 47. As the wheel 45 rotates, beans 49 are drawn from the hopper 51, and ground between the wheel and the chamber 47. A chute 53 connects to the bottom of the chamber 47, and leads downward to the filter basket 28. After the beans are ground, the ground beans fall through the chute 47 under the influence of gravity into the filter basket 28.

The coffee maker 20 includes a conventional pump 66 indicated in phantom in the side view of the coffee maker in FIG. 3. The pump 66 is located underneath the reservoir 24 and is thus self-priming. The reservoir 24 includes a valve 68 at the lower end of the reservoir 24, which is connected in fluid communication with the interior of the reservoir. The valve 68 slidably connects in fluid communication with a conduit 71, which connects in fluid communication with the pump 66. Water from the reservoir flows through the valve 68 through conduit 71 to the pump 66. Valve 68 includes a handle 70 for opening and closing the valve.

Preferably, the reservoir is removable from the coffee maker 20 for filling with water or cleaning. In a preferred embodiment, the reservoir includes a handle 73 as shown in FIG. 1, to facilitate removal/replacement of the reservoir 24. Preferably, the handle 73 is formed integrally with the outer surface of the reservoir, but may be a separately attached component. Alternatively, the handle 73 may simply be a notch formed in the outer surface of the resevoir to provide a finger grip. When the reservoir 24 has been removed from the coffee maker 20, and is being filled with water, valve 68 is closed to prevent the escape of water. After the reservoir 24 has been returned to the coffee maker 20, valve 68 is opened to permit water to flow from the reservoir to the pump 66.

The reservoir 24 includes a ruled scale 69 correlating the depth of water in the reservoir with an approximate number of units of coffee, e.g., cups of coffee, that amount of water will produce so that one can determine when the reservoir is sufficiently filled. The reservoir 24 is filled with water through a port formed in the top of the reservoir, which is closed by a cap 72, as indicated in the top view of the coffee maker 20 in FIG. 2.

In a preferred embodiment, the pump 66 pumps water from the reservoir 24 through a conventional electric heater 74, indicated in phantom in FIG. 3, located underneath the reservoir 24. The heater 74 heats the water as it is pumped to a temperature suitable for making coffee. Preferably, the heater 74 heats the water to a temperature just below boiling (212° F., boiling water damages the coffee grounds and corrupts the taste of the coffee). Thereafter, the heated water exits the heater through a vertical conduit 76, indicated in phantom. The conduit 76 directs the heated water upwardly along the opposite side of the reservoir 24, relative to the orientation of the coffee maker 20 shown in FIG. 3. The conduit 76 extends to the top of the coffee maker 20, and over the top of the filter basket 28, where the conduit preferably terminates at a shower disk 78, as shown in FIG. 2.

The conduit 76 suspends the shower disk 78 centrally over the top portion of the filter basket 28. The shower disk 78 includes a plurality of openings formed on its lower side adjacent the filter basket 28 for showering water received from conduit 76 over ground coffee beans located in the filter basket 28. The shield 62 (see FIG. 4) substantially prevents water from being showered into the grinder 23, as well as directing ground coffee beans into the filter basket 28.

The CPU 32 controls the pump 66 and the heater 74 via electrical signals 80 and 82, respectively, as shown in FIG. 7. In the preferred embodiment, the coffee maker 20 includes a water sensor 84 that provides an electrical signal 86 to the CPU indicating the presence of water. The water sensor 84 is preferably a pair of spaced-apart electrical contacts (not shown) located in the conduit 71 (see FIG. 3) connecting the valve 68 to the pump 66. When water is present in the conduit 71, an electrical connection is made between the electrical contacts indicating the presence of water.

In a preferred embodiment, the CPU 32 commands the pump 66 to operate only so long as water is available to the pump. Additionally, CPU 32 preferably causes the pump 66 to operate after the grinder 23 has ceased operation, thus ensuring that all of the beans are ground and in the filter basket 28 before water is showered into the filter basket.

The coffee maker 20 includes a temperature sensor 90, which provides an electrical signal 92 to the CPU 32 indicating the temperature to which the heater 74 heats the water. The temperature sensor 90 is located in the shower disk 78 so that the temperature of the water being showered on the ground coffee beans in the filter basket 28 is sensed. Preferably, the temperature of the water being showered on the ground coffee beans is at least approximately 200°, but less then boiling (212° F.). Thus, by the time the hot water has traveled through the ground coffee beans and the filter basket 28 into the thermal carafe 30, the water has reached an ideal temperature of between 195° F. to 205° F., which produces more desirable coffee. Temperatures above this range tend to damage the taste of the coffee. In a preferred embodiment of the invention, the control and display panel 33, includes a button or buttons 34 for adjusting the coffee temperature according to individual preference. The temperature sensor 90 is preferably of a conventional type, such as a thermistor, which changes resistance in proportion to the temperature of the thermistor.

The thermal carafe 30 is of substantially conventional design having a handle 94, and is removably inserted into the coffee maker 20 underneath the filter basket 28 as shown in FIG. 1. The thermal carafe 30 includes an automatic seal valve 93, preferably threadably capping the top of the carafe as shown cross-sectionally in FIG. 3A. Specifically, the valve 93 includes a lid portion 93a having external threads 93b that thread into internal threads formed into the top of the thermal carafe 30. A passage 93c is formed centrally through the lid portion 93a.

The automatic seal valve 93 includes a funnel-shaped member 96 extending centrally above the lid portion 93a from the passage 93c formed therethrough. An opening 96a is formed centrally through the funnel shaped member 96 as in a conventional funnel for the passage of fluids. The funnel shaped member 96 includes a column 96b extending concentrically through the opening 96a in the funnel-shaped member, wherein the ends of the column vertically extend to locations above and below the funnel shaped member. The diameter of the column 96a is less than the opening formed through the funnel shaped member 96a, such that fluid may flow around the column, through the opening 96a in the funnel shaped member. A plurality of vanes 96c connect between the funnel shaped member 96 and the column 96b, and support the column concentrically in the opening 96a in the funnel shaped member.

The lower end of the column 96a extends concentrically into the passage 93c formed through lid portion 93a. An inverted, cup-shaped gasket 97 connects centrally to the lower end of column 96b, such that the gasket is located on the lower side of the lid portion 93a. A spring 97a is mounted concentrically around the lower portion of the column 96b, between the funnel-shaped member 96, and the gasket 97. The lower side of the spring 97a is supported by a plurality of prongs 97b that extend inwardly from around the periphery of the passage 93c. Thus, the spring 97a presses against the prongs 97b to push the funnel-shaped member 96 upward. However, the gasket 97 has a diameter larger than the diameter of the passage 93c in the lid portion 93a. Thus, the spring 97a can only push the funnel shaped member 96 upward, until the gasket 97 lodges in the mouth of the passage 93c, thereby sealing the valve 93.

When the thermal carafe 30 is inserted into the coffee maker 20, the lower portion of the filter basket 28 presses against the vanes 96c of the valve 93. This compresses the spring 97a, such that the gasket 97 moves downwardly to the phantom position shown in FIG. 3 A, spaced below the passage 93c in lid portion 93a. This opens the valve 93 such that coffee can flow from the filter basket 28, through valve 93, into the thermal carafe 30.

When the thermal carafe 30 is removed from the coffee maker 20, the pressing force is removed from the vanes 96c, causing the valve 93 to seal, which prevents the escape of heat from the interior of the carafe. Preferably, valve 93 is composed primarily of plastic or other appropriate material that is not a good conductor of heat. Thermal insulation is therefore provided for the coffee, eliminating the need for an electric burner plate to keep the coffee warm. The coffee retains its aroma and taste for a longer period of time in the thermal carafe 30, relative to an electrically heated pot, and permits coffee to be moved about without losing a substantial amount of heat. Additionally, the absence of a warming plate saves energy, eliminates a potential fire hazard, and eliminates a hot surface that persons often burn themselves on.

Figure 3A:
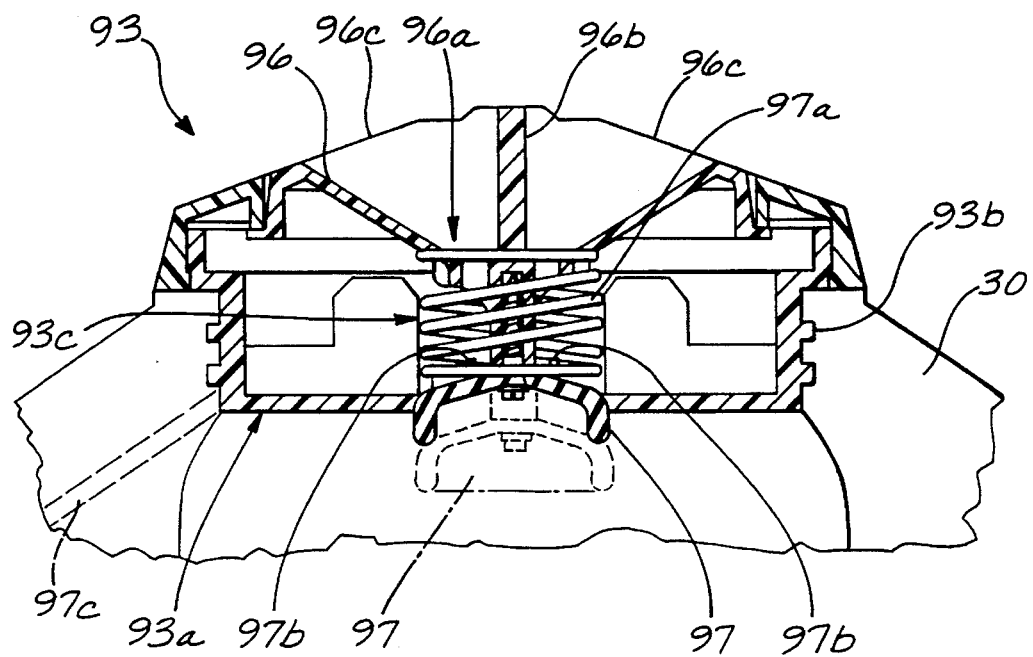
FIG. 3A illustrates a cross-sectional view of a self-sealing cap suitable for use with the coffee maker of FIG. 1.

When it is desired to pour coffee from the thermal carafe 30, the lid portion 93a may be threadably removed from the thermal carafe. Alternatively, the thermal carafe 30 includes an exterior spout (not shown) for pouring coffee. The spout connects to a passage or chamber 97c connected in fluid communication to the neck of the carafe. The automatic seal valve 93 may be threaded downwardly to close the passage 97c as shown in FIG. 3A. When it is desired to pour coffee, the automatic seal valve is threadably partially upward in the neck of the thermal carafe 30 to uncover and open the passage 97c. The carafe is then tipped until coffee flows through the passage 97c and out of the spout (not shown). In this way, coffee can be conveniently poured from the thermal carafe 30, while retaining the autmatic seal valve 30 partially threaded to the carafe.

In an alternative embodiment, automatic seal valve 93, or a similar type automatic seal valve could be used in place of valve 68 at the bottom of the reservoir 24. Thus, when the reservoir 24 is removed from the coffee maker 20, the valve would automatically seal to prevent water from passing therethrough. However, when the reservoir 24 is inserted into the coffee maker 20, the valve would automatically open.

In a preferred embodiment, the coffee maker 20 can also be used in a manual mode by pressing an appropriate button or buttons 34 on the control and display panel 33. In the manual mode, the CPU 32 is commanded to immediately cause the coffee maker 20 to begin making coffee, rather than waiting for the time specified in the alarm display 44. Preferably, in the manual mode, one of the buttons 34 can be pressed that immediately commences operation of the grinder 23 so long as that button is subjected to a pressing force. Thus, direct control is provided over the length of time that the grinder operates in manual mode.

In addition, preferably the control and display panel 33 includes a button or buttons 34 for a brew-only function. Thus, if it is desired to use pre-ground coffee, the pre-ground coffee can be placed directly in the filter basket 28. Then the brew-only function can be performed, which commands the coffee maker 20 to by-pass operation of the grinder 23, and proceed directly to brewing coffee.

A micro-switch (not shown) preferably detects when the cap 56 to the grinder 23 is in place. If the cap 56 is not in place, the grinder 23 is prohibited from operating by the CPU 32 for safety, cleaning, and to prevent ground coffee beans from being scattered about. Alternatively, rather than providing for manual operation of the grinder 23 through pressing a button 34 on the control and display panel 33, the grinder can be manually operated by pressing downward on the cap 56 as in many conventional grinders. Pressing downward on the cap 56 activates a switch (not shown) that causes the grinder to operate. In this way, the grinder is prevented from being operated manually without the cap 56 being in place.

The coffee maker 20 is mountable to a surface, such as a wall, or under a counter. In one preferred embodiment, this is achieved by providing a bracket 98, which may be in the shape of a rectangular plate, as shown in FIG. 5, that is mountable to a surface, such as a wall. Preferably, fastening devices, such as screws, nails, or bolts 100, are used to penetrate through the bracket 98 to mount the bracket to a surface. The side of the bracket 98 opposite the mounting surface supports four arms 102 that are substantially arranged in a cross formation, wherein the intersection of the arms is preferably located generally along the central axis of the bracket 98.

The arms 102 are arranged in pairs, wherein each arm of a pair generally opposes the other arm of that pair. One pair of arms 102 preferably extends more or less vertically, while the other pair extends approximately perpendicular to the vertical pair of arms. In a preferred embodiment, the arms 102 are received in channels formed in the side of bracket 98 that faces away from the mounting surface. The arms may be retained in place on bracket 98 by any conventional means, such as glues, adhesives, screws, bolts, or welding. In FIG. 5, the arms 102 are illustrated as fastened to bracket 98 by fasteners 100 that penetrate through each of the arms 102 and through the bracket 98 into the mounting surface.

Preferably, the arms 102 are formed of metal or plastic, or other material with sufficient structural integrity, and are integral with one another. More particularly, each of the arms 102 are not separate pieces, but seamlessly connect to one another in a cross arrangement. The distal end of each arm 102 bends approximately perpendicular away from the bracket 98 to form a finger 104 extending away from the mounting surface. Each of the fingers 104 connect to the housing 21 at generally opposing locations 108. Fasteners 110 penetrate through each of the fingers 104 into the housing 21 and thread therein. The fasteners 110 may be of any type known in the art, such as screws, bolts, rivets, pins, and etc. However, preferably the fasteners 110 are knob-screws so that the coffee maker 20 is removable from the fingers 104 by turning the knob-screws 110 to uncouple the knob-screws from the housing 21.

In another preferred embodiment, the coffee maker 20 is removably mounted to a surface by including a mounting plate 112 that projects from the rear of the housing 21 forming the coffee maker 20, as shown in FIGS. 2 and 6. The mounting plate 112 is generally rectangular in shape and includes a lip 114 extending from opposite vertical edges of the mounting plate, spaced apart from the rear of the housing 21 as indicated in FIG. 6.

The mounting plate 112 is slidably receivable in a mounting bracket 116 that is attached to a mounting surface. The mounting bracket 116 is generally rectangular in shape, having opposite vertical edges that form a pair of opposing channels 118 on the side of the bracket opposite the mounting surface. The lips 114 of the mounting plate 112 on the rear of the coffee maker 20 are each slidably received in a channel 118 of the mounting bracket 116. The bottom of each channel 118 includes a stop (not shown) that prevents the mounting plate 112 from being slid all the way through the channels 118 on the mounting bracket 116.

The mounting bracket 116 may be mounted to a surface by any conventional method known in the art. For example, screws, bolts, or adhesives may be used. Preferably, fasteners are used that penetrate through holes 120 formed in the mounting bracket 116, wherein the fasteners penetrate into the surface behind the bracket. Mounting plate 112 also mounts to the rear of the coffee maker 20 by any conventional method known in the art, such as screws, bolts, adhesives, or welding. Further, the mounting plate 112 may be formed integrally with the housing 21 forming the exterior of the coffee maker 20. In operation, the coffee maker 20 is removably slid into and out of engagement with the mounting bracket 116 if it is desired to temporarily relocate the coffee maker to another location.

In yet another preferred embodiment, a two-armed bracket 150 is provided for mounting the coffee maker 20 as shown in FIG. 6A. The bracket 150 includes a pair of spaced apart parallel arms 152. The arms 152 are each cantilevered edge-wise at approximate right angles from a rear, rectangular support plate 154. Preferably, the arms 152 are formed integrally with the rear support plate 154, wherein the bracket 150 is formed of metal or plastic, or other material that has some flexibility, yet sufficient structural integrity to safely support the coffee maker 20.

The coffee maker 20 is received between the arms 152. The arms 152 may receive the rear, top, or sides of the coffee maker 20 as respectively shown in FIGS. 6A, 6B, and 6C. The arms 152 could even receive the bottom of the coffee maker 20, if it were desirable to mount the coffee maker to the upper side of a horizontal surface. This might be desirable if the horizontal surface was located in a moving vehicle, such as a boat, motor home, airplane, or other vehicle.

Fasteners 110 penetrate through each of the arms 152 into the housing 21 and thread therein. The fasteners 110 may be of any type known in the art, but preferably are knob-screws. Thus, the coffee maker 20 is removable from the arms 152 by turning the knob-screws 110 to uncouple the knob-screws from the housing 21.

In a preferred embodiment, a rectangular projection 156 is formed on the inside of each arm 152 at the location where the arm is fastened to the housing 21 with a fastener 110. Each rectangular projection 156 is slidably received in a rectangular recess 158 formed in the housing 21 of the coffee maker 20. The rectangular projections 156 and recesses 158 help ensure the coffee maker 20 will not pivot in bracket 150, if only a single fastener 110 is used to fasten each arm 152 to the coffee maker. Alternatively, the rectangular projections could be eliminated, and two or more fasteners 110 could be used to fasten each arm 152 to the coffee maker.

The rear support plate 154 of the bracket 150 includes two spaced apart holes 160 formed therethrough. The holes 160 are for mounting the bracket to a wall, counter, cabinet, or other surface. Specifically, screws, bolts, nails, or other fastening devices are inserted through holes 160, and into the mounting surface.

In an alternate embodiment, a plurality of holes 162 could be formed through the arms 152 as shown in FIG. 6C, and in the housing 21 of the coffee maker 20. The plurality of holes 162 are for selectively fastening the coffee maker 20 at different locations between the arms 152.

Figure 6D:
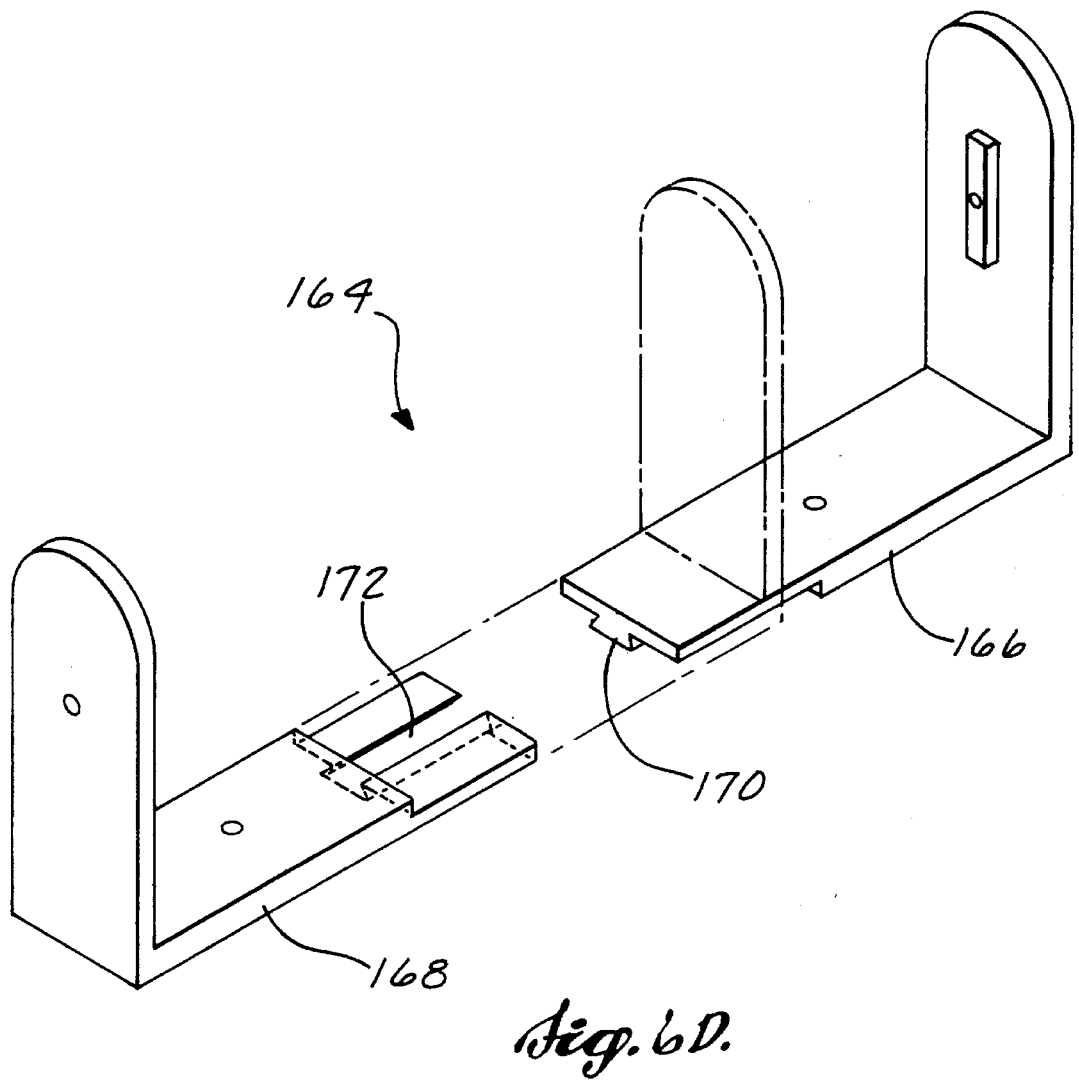

In still another preferred embodiment, a bracket 164 is provided as shown in FIG. 6D. Bracket 164 is substantially identical to bracket 150 described previously, except that bracket 164 includes a first half 166 slidably connected to a second half 168. More particularly, half 166 includes a dovetail 170 projecting from along the rear of the bracket half. The other bracket half 168 includes a corresponding dovetail slot 172 formed along the front of the bracket. The dovetail 170 from the first bracket half is slidably received in the dovetail slot 172. Thus, the bracket 164 is slidably adjustable to receive different sized coffee makers, or other appliances. Dovetail 170, and dovetail slot 172 may have other geometries that permit the first bracket half 166 to be slidably received by the second bracket half 168, such as a T-shaped projection received in a T-shaped slot, or a rectangular projection received in a rectangular slot by way of illustrative non-limiting example.

Figure 8:
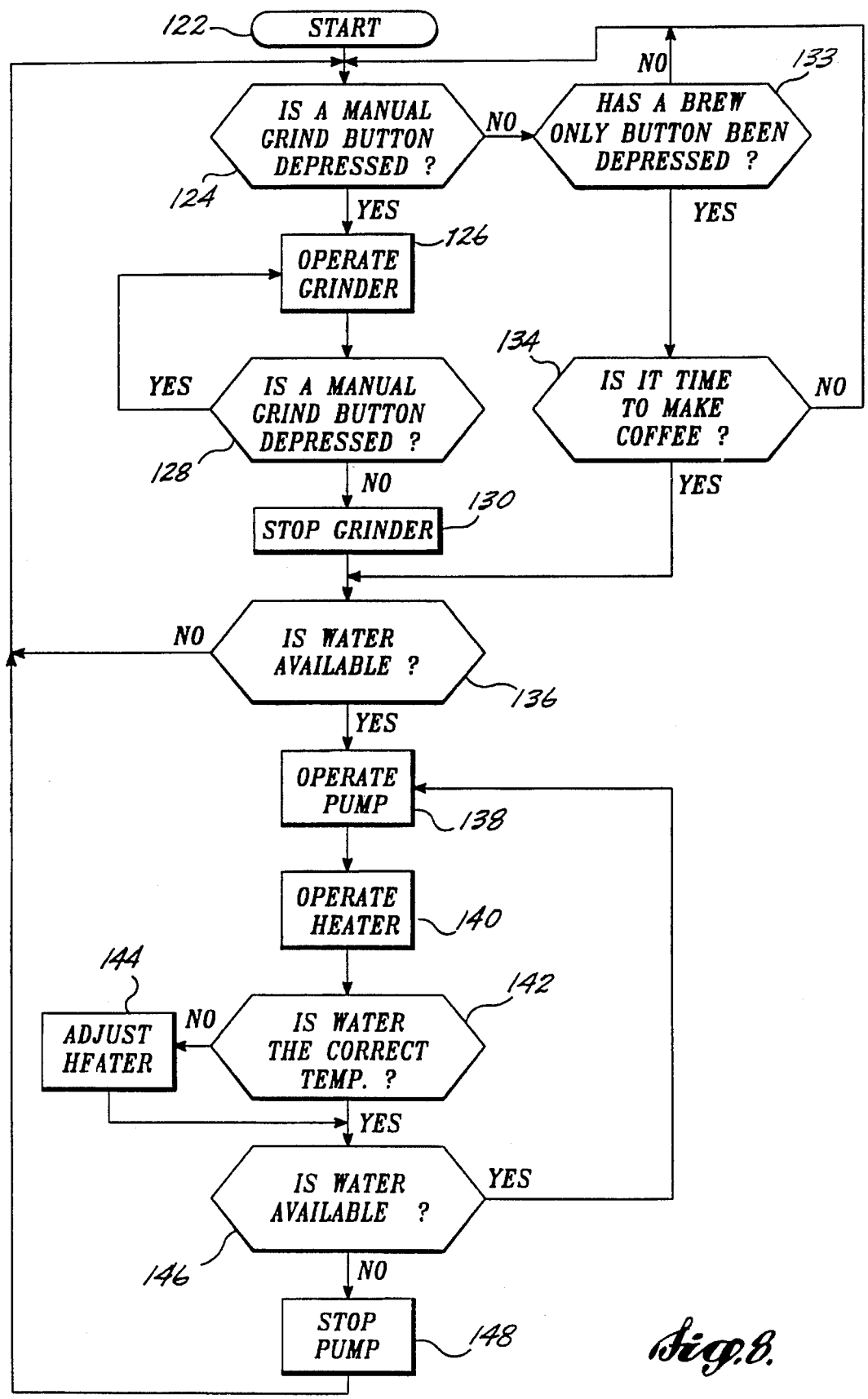
FIG. 8 illustrates a schematic diagram showing overall logic for use with the coffee maker of FIG. 1.

Overall logic suitable for use with the coffee maker 20 is schematically illustrated in FIG. 8. The logic in FIG. 8 commences with a start block 122 followed by a decision block 124. Decision block 124 inquires as to whether a manual grind button has been depressed on the control and display panel 33. If so, the logic proceeds to block 126, which operates the grinder 23. Thereafter, a decision block 128 inquires once again whether a manual grind button is depressed. If so, the logic returns to block 126 and continues to operate the grinder so long as a manual grind button is depressed. Once a manual grind button is no longer depressed, the grinder 23 is stopped in block 130.

In the situation where a manual grind button is not initially depressed, the logic inquires as to whether an alarm has been set in decision block 132. If not the logic inquires in decision block 133 whether a brew only button has been pressed. If not the logic returns to the beginning. Otherwise the logic proceed to decision block 136 to inquire whether water is available.

If the answer to whether an alarm has been set in decision block 132 is affirmative, the logic proceeds to decision block 134 to inquire whether it is time to make coffee. If so, the logic proceeds to decision block 136 to inquire whether water is available. Otherwise, the logic returns to the beginning.

If it is time to make coffee, the grinder 23 has been stopped, or a brew only button has been depressed, decision block 136 inquires whether water is available. If water is unavailable, the logic returns to its beginning. Otherwise the pump 66 is operated in block 138, followed by operation of the heater 74 in block 140.

Following operation of the heater 74, decision block 142 inquires whether the water has been heated to the correct temperature. If the water is not at the correct temperature, the heater 74 is adjusted accordingly in block 144. Otherwise, the heat adjust block 144 is bypassed, and decision block 146 inquires whether water is available. If water is available, the logic loops back to block 138 and continues to operate the pump. Otherwise, the pump is stopped in block 148, and the logic repeats.

In this way, the logic continually repeats, either waiting for the manual grind button to be depressed, or inquiring whether an alarm is set, and if so, whether it is time to make coffee. When either of these conditions are met, the pump is operated until no more water is available. When water is no longer available, the logic presumes that the coffee making cycle is over, and repeats the cycle again.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A coffee maker for making coffee, comprising:
   (a) a housing;
   (b) a coffee grinder connected to the housing, the grinder receiving and grinding coffee beans and automatically discharging the ground beans;
   (c) a brewer connected to the housing, the brewer including:
      (i) a reservoir for holding water;
      (ii) a filter basket for receiving ground coffee beans discharged from the coffee grinder and water from the reservoir;
      (iii) a pump in fluid communication with the reservoir for pumping water from the reservoir to the filter basket; and
      (iv) a heater for heating water from the reservoir before the water is received in the filter basket;
   (d) a thermally insulated carafe, removably connected to the housing for receiving coffee from the filter basket of the brewer; and
   (e) a central processing means having a timer and a memory and operably connected to the pump, heater, and grinder for causing coordinated operation of the coffee maker at desired times based on data stored in the memory of the central processing means.

2. The coffee maker of claim 1, further comprising a control panel electrically connected to the central processing unit, the control panel having a plurality of switches, the switches transmitting signals to the central processing unit when the switches are pressed, wherein pressing one of the switches causes the central processing unit to operate the coffee maker in manual mode based on electrical signals received from the switches, rather than at times based on data stored in the memory of the central processing unit.

3. The coffee maker of claim 1, wherein the coffee maker is mountable to a surface, further comprising:
   (a) a bracket including:
      (i) means for mounting the bracket to a surface; and
      (ii) a pair of spaced apart channels; and
   (b) a plate mounted to the housing having opposite edges, wherein one of the edges is slidably received in one of the channels, and the other edge is slidably received in the other channel.

4. The coffee maker of claim 1, wherein the coffee maker is mountable to a surface, further comprising a bracket including:
   (a) means for mounting the bracket to a surface;
   (b) a plurality of arms projecting from the bracket in a direction away from the surface; and
   (c) means for removably connecting the housing to the arms.

5. The coffee maker of claim 1, wherein the grinder includes a switch for causing manual operation of the grinder when operation of the grinder is not being caused by the central processing unit.

6. The coffee maker of claim 1, wherein the grinder includes a ruled scale correlating depth of coffee beans with approximate units of coffee.

7. The coffee maker of claim 6, wherein the grinder includes a removable cap, which includes the ruled scale.

8. The coffee maker of claim 7, wherein the amount of water is indicated in units of coffee.

9. The coffee maker of claim 1, wherein the reservoir includes indicating means for indicating the amount of water contained in the reservoir.

10. The coffee maker of claim 1, further comprising a temperature sensor operably connected to the central processing means, and in thermal communication with water heated by the heater, for providing a signal to the central processing means indicating the approximate temperature of water heated by the heater.

11. The coffee maker of claim 1, further comprising a water sensor operably connected to the central processing means and in fluid communication with water from the reservoir, for providing a signal indicating the presence of water.

12. The coffee maker of claim 1, further comprising a shower head positioned above the filter basket in fluid communication with the pump, for showering water received from the pump into the filter basket.

13. The coffee maker of claim 12, further comprising a temperature sensor located in the shower head and operably connected to the central processing unit, the temperature sensor providing an electrical signal to the CPU, indicative of the temperature of water received from the pump.

14. The coffee maker of claim 1, wherein the grinder is a blade type of grinder.

15. The coffee maker of claim 1, wherein the grinder is a burr type of grinder.

16. The coffee maker of claim 1, wherein the reservoir is removable from the coffee maker.

17. The coffee maker of claim 1, wherein the water received in the filter basket has a temperature ranging from about 195° F. to 205° F.

* * * * *